US012433722B2

(12) United States Patent
Querbes et al.

(10) Patent No.: US 12,433,722 B2
(45) Date of Patent: Oct. 7, 2025

(54) TAKING AN OPTICAL IMPRESSION OF A PATIENT'S DENTAL ARCH

(71) Applicants: Olivier Querbes, Vallesvilles (FR); Véronique Querbes-Duret, Vallesvilles (FR)

(72) Inventors: Olivier Querbes, Vallesvilles (FR); Véronique Querbes-Duret, Vallesvilles (FR)

(\*) Notice: Subject to any disclaimer, the term of this patent is extended or adjusted under 35 U.S.C. 154(b) by 334 days.

(21) Appl. No.: 18/008,656

(22) PCT Filed: Jun. 4, 2021

(86) PCT No.: PCT/EP2021/065068
§ 371 (c)(1),
(2) Date: Dec. 6, 2022

(87) PCT Pub. No.: WO2021/245274
PCT Pub. Date: Dec. 9, 2021

(65) Prior Publication Data
US 2023/0240818 A1    Aug. 3, 2023

(30) Foreign Application Priority Data
Jun. 6, 2020 (FR) .................................. FR2005929

(51) Int. Cl.
*A61C 9/00* (2006.01)
*G06T 7/33* (2017.01)

(52) U.S. Cl.
CPC ............ *A61C 9/0053* (2013.01); *G06T 7/337* (2017.01); *G06T 2207/20084* (2013.01); *G06T 2207/20221* (2013.01); *G06T 2207/30036* (2013.01)

(58) Field of Classification Search
CPC ................. A61C 9/0053; G06T 7/337; G06T 2207/20084; G06T 2207/20221; G06T 2207/30036; G06T 5/50; G06T 17/00
See application file for complete search history.

(56) References Cited

U.S. PATENT DOCUMENTS

2018/0168781 A1    6/2018   Kopelman
2019/0231492 A1    8/2019   Sabina
(Continued)

FOREIGN PATENT DOCUMENTS

WO    201518181454 A1    12/2015
WO    2019133583 A1     7/2019

*Primary Examiner* — Jeffery A Brier
(74) *Attorney, Agent, or Firm* — CRGO Global; Steven M. Greenberg (57) ABSTRACT

By combining the wide field of the image sensor of a smartphone (61) or the like, with the precision of the image sensor of an IOS (62) or the like, the process of generating a three-dimensional reconstruction of a patient's dental arch, referred to as extended optical impression, is improved and simplified. More specifically, the practitioner can take, in a single image, a global but not very precise 3D reconstruction (30) of the arch, then substitute, for the areas (or sectors) of this reconstruction which require a finer precision, precise local 3D reconstructions (41,42,43) obtained with the IOS. A related algorithm (263) is responsible for merging the global reconstruction with each of the local reconstructions, in order to produce a single precise 3D reconstruction (50) which corresponds to the desired optical impression.

11 Claims, 5 Drawing Sheets

(56) References Cited

U.S. PATENT DOCUMENTS

2020/0041260 A1* 2/2020 Hollenbeck .......... G01B 11/245
2020/0342614 A1* 10/2020 Yan .......................... G06T 7/33
2021/0158614 A1* 5/2021 Katzman .................. A61C 7/08

* cited by examiner

TAKING AN OPTICAL IMPRESSION OF A PATIENT'S DENTAL ARCH

CROSS-REFERENCE TO RELATED APPLICATIONS

This application is a § 371 national phase entry of International Application No. PCT/EP2021/065068, filed Jun. 4, 2021, which claims priority to French Patent Application No. 2005929 filed on Jun. 6, 2020.

TECHNICAL FIELD

The present invention relates generally to three-dimensional (3D) imaging, and in particular to techniques for optical impression of an oral surface such as a dental arch of a patient, that is to techniques making it possible to generate a three-dimensional reconstruction of a patient's dental arch.

The embodiments take advantage of progress made in deep learning architectures such as deep neural networks and convolutional neural networks or CNNs to perform three-dimensional imaging applications from two-dimensional (2D) images acquired by an acquisition device comprising one or more 2D image sensors.

The invention finds uses in various applications of oral imaging, for example for dental reconstruction, creation of dental implants, aesthetic dental surgery, etc. These examples are not limiting.

PRIOR ART

Optical impression is an acquisition technique that is more effective than conventional, physical/chemical impressions, regardless of the material used. Patients prefer the digital impression technique rather than conventional techniques, in particular due to the absence of an induced gag reflex. This technique is less invasive since it requires neither preparation, nor cleaning or disinfection, and the risk of infectious contamination related to the production of a conventional impression is eliminated. It is more effective and ergonomic, with the presence of a screen making it possible to dispense with direct vision in the mouth for the practitioner. It is also faster because the data acquisition is relatively fast, and it is possible to repeat new captures during the session. The archiving of the optical imprints is less cumbersome, and this type of impression gives the practitioner the ability to store the captured information indefinitely. Finally, improved transfer of the digital images is possible between the dental practitioner's office and the prosthesis manufacturing laboratory, where appropriate.

Generally, the optical impression is the first step of a dematerialized digital workflow running from the initial step to the clinical placement of a dental prosthesis, for example. When realized using a camera combined with software, it is a crucial step of computer-assisted design and manufacture (CAD/CAM), which makes it possible to limit the inaccuracies of dental prostheses. For taking the impression, a camera associated with software is used, capable of producing several thousand 3D images per second.

Although there are many recording methods, today CAD/CAM mainly uses the direct method by triangulation of structured light, on the one hand, and the indirect method in active and/or focused structured light, on the other hand.

The principle of structured light triangulation consists of placing a light emitter and a receiver (i.e., a camera), such that the object to be recorded (e.g., a tooth) is at the top of the triangle formed by the transmitter, the receiver, and the tooth. The receiving camera measures the projection of a bright point on the tooth. In order to obtain better precision, and for faster acquisition and better quality, a fringe of parallel lights is projected (and not only a light ray). The object returns the reflected light rays to the receiver. However, this recording method has practical drawbacks related to the positioning in the mouth of the transmitter and the receiver.

The indirect method in active or structured light consists of projecting a periodic network onto the object, and of observing it through a second network. It resembles the triangulation method, but differs from a mathematical point of view. This is because the information is perceived by virtue of the interference of two ripple or macroscopic networks which are projected and observed, respectively, on the object.

In addition, the optical acquisition of oral volumes such as dental arches can be done using an intraoral scanner or IOS (intraoral scanner). More particularly, the acquisition can be done in two ways: either image by image, or by a continuous digital stream of images. In both cases, a 3D reconstruction mechanism makes it possible to reconstruct the 3D surface of the arch from the 2D images acquired by the IOS.

In the first case (image-by-image method), the recording is done by a succession of captured images. The software then performs the end-to-end positioning of the images thanks to common parts which exist between them. The images which are not usable are rejected in real time. At the end of the acquisition, the software indicates the missing areas to allow the practitioner to resume their impression where those missing areas are found. The practitioner places the camera above the area to be recorded and it is using a sound or visual signal that the image is shown. During recording, the camera must be very stable. For this purpose, stabilization devices exist that are very useful in particular for practitioners. This exposure is rather suited to sectoral impressions, that is to say which relate to a limited portion only of the dental arch, because they involve few images relative to the extended impressions, that is which relate to the entirety of the dental arch or to a substantial portion thereof.

The case of the continuous flow or the video stream, for its part, makes it possible to record the oral volumes by overflying the surfaces. A large number of images can be recorded. The continuous flow can be used for extended impressions such as complete dental arches. During the acquisition, the software directly shows the practitioner, in real time, a video feedback making it possible to view the position of the camera and the construction of the virtual model in progress. If a missing area appears, it suffices for the practitioner to return to it in order to offset the black hole. This picture-taking allows freedom of movement, but a rigorous scan path, must be respected.

However, using an IOS is not necessarily easy, in particular because the movement of the practitioner is constrained by the "tracking", i.e., the scan path. Adherence to this path is a need to have a coherent arch. It implies that the movement must follow a continuous and uninterrupted path. For example, if the molar of the background is started to the right, the molar range at bottom-left cannot be recorded in one hop. On the contrary it must be joined by a continuous path, i.e. sweeping the camera along the arch and non-discontinuously: right premolar, then right canine, incisors, left canine, left premolar and finally left molars. This is the main defect of acquisition by an IOS. Practitioners must practice taking continuous paths. If the movement is carried out on the side, or goes too quickly, the practitioner loses the tracking and must go back to find an area of the already reconstructed arch, wait for the camera to recognize it, then restart from there in the initial direction.

In addition to IOSs, there are other devices for capturing two-dimensional images, which could advantageously be exploited to combine with IOSs.

These devices include mobile phones, tablets, augmented reality glasses and digital cameras. These devices, although less precise than IOSs, have the advantage of a wide field of view, which often encompasses the field of a dental arch. Of course, they are not directly suitable for reconstructing dental tissue due to its specularity and lack of texture. An algorithm will be presented which makes it possible to transform each of their two-dimensional image into a coarse but dense three-dimensional reconstruction (i.e., with a large number of 3D points).

The object of the invention is to observe that, by combining the wide field of a device of this kind, which we will hereinafter call the global device, with the precision of an IOS, that we will call local device subsequently, the clinical process of acquiring an extended dental impression could be lightened.

Document US2013330684 discloses a system comprising an intraoral camera, as well as a set of other sensors/transmitters in the body of the camera, and/or in a hardware appendix to which the camera can attach. Among these other sensors, a 2D camera is provided to take photos of the patient's face, and optionally to make a 3D reconstruction. A 3D registration is possible between the 3D model of the patient's dental arch reconstructed by the intraoral camera and the 3D model of the face obtained from the photos taken by the 2D camera.

Document US2008305458A discloses a method that comprises the generating of a three-dimensional intraoral image of the crown of one tooth or crowns of a plurality of selected teeth, the generating of a three-dimensional image of the root of the tooth or corresponding roots of the corresponding selected teeth, and the composition of the three-dimensional images of the crown(s) and the root(s) of the tooth to produce a composite image. The tooth root image is produced by X-ray imaging or by magnetic resonance imaging (MRI).

Finally, document FR3032282A1 discloses the generating, by augmented reality glasses, of a 3D reconstruction from two or more images. This 3D reconstruction can be made locally precise by information provided by an intraoral scanner (IOS) that is more precise, merging the 3D reconstruction and of this information by 3D registration.

DISCLOSURE OF THE INVENTION

The invention proposes a method and a device capable of alleviating the disadvantages of the aforementioned prior art which result from the need to provide tracking upon taking an extended impression of a patient's dental arch, that is generating a three-dimensional reconstruction of the patient's dental arch.

The invention addresses these drawbacks by proposing a solution to the problem of tracking with a first aspect of the invention which relates to a method for generating a three-dimensional reconstruction of a patient's dental arch, called extended optical impression, comprising the following steps implemented under the control of a practitioner:

obtaining at least one global two-dimensional image of the acquired dental arch with a first image sensor having a relatively wide field of view and relatively low precision, and generating by first digital data processing means a global, relatively coarse three-dimensional reconstruction of the dental arch from said two-dimensional image;

acquiring a plurality of respective local two-dimensional images of respective associated sectors of the dental arch with a second image sensor having a relatively more restricted field of view and a relatively higher precision than the first image sensor, and generating by second digital data processing means respective local reconstructions, relatively more precise than the global three-dimensional reconstruction, of said associated sectors of the dental arch;

merging, by a merging algorithm performed by third digital data processing means, the global three-dimensional reconstruction and local three-dimensional reconstructions into a single total three-dimensional reconstruction wherein the local three-dimensional reconstructions are respectively substituted with portions of the global three-dimensional reconstruction that correspond to the associated sectors of the dental arch, the global reconstruction playing a role of absolute spatial guide, said merging comprising a setting of local three-dimensional reconstructions in the global three-dimensional reconstruction, said setting being adapted to minimize a distance between the point clouds corresponding to each of the associated sectors of the dental arch and the corresponding point cloud of the global three-dimensional reconstruction.

By combining the wide field of the first image sensor (which may be a smartphone or the like, and which will be referred to as a global apparatus or device from here on), with the precision of the second image sensor (which may be an IOS or similar, and which will be referred to as a local apparatus or device from here on), the clinical process of taking an extended optical impression of a patient's dental arch is improved and simplified. Indeed, by virtue of the global apparatus, the practitioner can take into a single image a three-dimensional global reconstruction, and then with the IOS only reconstruct the zones (or sectors) of the dental arch requiring finer precision, producing one or more precise local reconstructions. An auxiliary algorithm is responsible for merging the global reconstruction with each of the local reconstructions, in order to produce a single mixed three-dimensional reconstruction that corresponds to the desired optical impression.

If the practitioner wishes to reconstruct, with precision, separate local areas, that is to say without any overlap between them, the merging process allows it to: in fact, the global reconstruction plays the role of an absolute spatial guide for the respective pose of each of the local reconstructions, which are found in the global reconstruction by registering in the same spatial reference frame.

Furthermore, the problem of loss of tracking is resolved. This is because if the principle that, according to embodiments of the invention which will be explained, each image coming from the IOS can produce a dense 3D reconstruction, then each of these images can lead to a local reconstruction, which can be registered to global reconstruction, and which then adds to all the other local reconstructions previously performed but without the need for an overlap between the corresponding zones of the dental arch to ensure continuity, and without the need to follow an imposed tracing path. According to the embodiments of the invention, the continuity of the impression is ensured by the underlying global reconstruction, regardless of the relationship, and even in the absence of relationship, between the local reconstructions of the sectors of the dental arch respectively associated with these local reconstructions.

The person skilled in the art will appreciate that the global and local reconstructions do not have the need to be carried out at the same time, nor in the same place. Thus, the global reconstruction can be generated by the patient on their own via a global apparatus such as their smartphone, and be transmitted remotely (by email, or by 3G-LTE cellular network, 4G or 5G, etc.) to their practitioner for a first notice (clinical diagnosis, aesthetic diagnosis, etc.). If necessary, the practitioner can then offer his patient an office appointment in order to complete the global reconstruction, using another local apparatus.

It should be noted that, in the context of deep learning techniques used in the field of Artificial Intelligence (or AI), supervised learning algorithmic models require specific knowledge regarding the problem studied, whereas unsupervised learning algorithmic models do not require it. Training of the convolutional neural network according to the embodiments of the invention is said to be "semi-supervised" in the sense that the CNN is designed and trained for a particular application.

Advantageously, the invention may also implement multi-view stereoscopy in order to generate more precise global or local 3D reconstructions from each of a plurality of 2D images of the same object taken under different respective viewing angles by a binocular image acquisition device. However, it can also eliminate by operating where appropriate with a single 2D image sensor, that is with a 2D image acquisition device (or 2D imager) which is monocular and which is used to acquire a single 2D image for each 3D reconstruction to be generated.

The method according to the first aspect of the invention may further comprise the following features taken in isolation or in combination:
- the first image sensor may be an image sensor of a portable digital device of the patient, such as a mobile phone, and the global two-dimensional image can be acquired by the patient on their own using their portable digital apparatus and be transmitted from said portable digital apparatus to the practitioner for the generation of the global three-dimensional reconstruction;
- the method may comprise acquiring the global two-dimensional image by the practitioner using the first image sensor;
- the first image sensor may be comprised in augmented reality glasses further comprising the first digital processing means for generating the global three-dimensional reconstruction;
- the second image sensor may be an intraoral scanner, comprising the second digital data processing means for generating local three-dimensional reconstructions;
- the global three-dimensional reconstruction and/or local three-dimensional reconstructions can be carried out by generating for each a depth map from a single 2D image acquired by the first sensor or by the second image sensor, respectively, based on a deep learning architecture previously trained for this purpose.

In addition, a second aspect of the invention relates to a computer program comprising instructions which, when the computer program is loaded into the memory of a computer and is executed by a processor of said computer, cause the computer to perform all the steps of the prediction phase of the method according to the first aspect.

A third aspect of the invention relates to a device for generating a three-dimensional reconstruction of a patient's dental arch, called an extended optical impression, comprising:
- a first image sensor having a relatively wide field of view and relatively low precision for acquiring at least one global two-dimensional image of the dental arch, and first digital data processing means for generating a global, relatively coarse three-dimensional reconstruction of the dental arch from said two-dimensional image;
- a second image sensor having a relatively more restricted field of view and a relatively higher precision than the first image sensor, for acquiring a plurality of respective local two-dimensional images of respective associated sectors of the dental arch, and second digital data processing means for generating respective local reconstructions, relatively more precise than the global three-dimensional reconstruction, of said associated sectors of the dental arch; and,
- third data processing means configured to implement a merging algorithm adapted to merge the global three-dimensional reconstruction and local three-dimensional reconstructions into a single total three-dimensional reconstruction wherein the local three-dimensional reconstructions are respectively substituted with portions of the global three-dimensional reconstruction that correspond to the associated sectors of the dental arch, the global reconstruction playing a role of absolute spatial guide, the merging algorithm comprising a setting of local three-dimensional reconstructions in the global three-dimensional reconstruction, said setting being adapted to minimize a distance between the point clouds corresponding to each of the associated sectors of the dental arch and the corresponding point cloud of the global three-dimensional reconstruction.

The device according to the third aspect of the invention may further comprise the following features taken in isolation or in combination:
- the device may comprise augmented reality glasses which comprise the first image sensor and, furthermore, the first digital processing means for generating the global three-dimensional reconstruction;
- the device may comprise an intraoral scanner that comprises the second image sensor and, further, the second digital data processing means for generating local three-dimensional reconstructions
- the first digital processing means and/or the second digital processing means can be configured to generate the global three-dimensional reconstruction and local three-dimensional reconstructions, respectively, by generating for each one a depth map from a single 2D image acquired by the first sensor or by the second image sensor, respectively, based on a deep learning architecture previously trained for this purpose.

Finally, a fourth and last aspect of the invention relates to an optical impression apparatus comprising a computer which comprises the third means for processing digital data of the device according to the third aspect above, as well as means suitable for implementing the method according to the first aspect.

DESCRIPTION OF DRAWINGS

Other features and advantages of the invention will become apparent on reading the description which follows.

This is purely illustrative and should be read in conjunction with the accompanying drawings, in which.

DESCRIPTION OF THE EMBODIMENTS

In the description of embodiments which will follow and in the figures of the accompanying drawings, the same or similar elements bear the same reference numerals in the drawings. Unless this provides additional information for the clarity of the description as a whole, elements appearing several times on different figures to which reference will be made successively, will not be described in detail each time, in order not to unnecessarily overburden the description.

Embodiments of the invention will be described in the non-limiting context of the acquisition of an extended optical dental impression by a dentist practitioner, for example.

Before beginning the description of detailed embodiments, it is also useful to specify the definition of certain expressions or terms that will be used therein. Unless otherwise arranged, these definitions apply notwithstanding other definitions that a person skilled in the art can find in certain works of the specialized literature.

"Dental arch of a patient" means the set of 32 teeth forming the dentition of a human being, that is all the static dental tissues including the gums, the teeth, and any prosthetic material (crowns, rings, scan bodies, inlay-core, inlay-onlay, etc.). If appropriate, depending on the context, a distinction is sometimes made between the upper arch which corresponds to half of the teeth implanted in the upper jaw of the individual, and the lower arch which corresponds to the other half of the teeth implanted in the lower jaw of said individual, on the other hand.

"Optical" impression of a patient means a impression of the patient's dentition in the form of an image, in this case a three-dimensional (3D) image, as opposed to a conventional physical impression obtained by molding upper and lower dental arches. Furthermore, an "extended" optical impression of a dental arch is a representation in the form of a 3D image of the entirety of the arch, or of a substantial part of the arch, i.e., a portion of the arch corresponding to at least one half-arch, that is the half-arch seen on the left-hand side or on the right-hand side of the patient. Such an extended arch is as opposed to a impression of only one sector of said arches, limited to a tooth or a few teeth only.

An "image" or "view", or "scan" is constituted by a set of points of the real three-dimensional scene. For a 2D image acquired by an image acquisition device, or imaging device (for example a CCD sensor or a CMOS sensor), the points concerned are the points of the real scene projected in the plane of the focal length of the 2D sensor used to acquire the 2D image, and are defined by the pixels of the 2D image. For a reconstructed 3D image (also called "3D reconstruction", this term denotes the product or result of the 3D reconstruction processing), the points concerned being a 3D point cloud obtained by a transformation of a "depth map" (see definition given below). Such a cloud of points defines a skeleton of the three-dimensional scene. A 3D mesh of this point cloud, for example a triangulated 3D point mesh, can define an envelope.

An "n-tuple" of images, where n is an integer greater than or equal to the unit, is a set of n images taken simultaneously by the sensor(s) of an image acquisition device (or imaging device). In general, the imaging device has two sensors, making it possible to generate a doublet (i.e., a 2-tuple) of images of the same scene respectively acquired simultaneously by each of these two sensors. But it may have three, four, five, etc. sensors making it possible to acquire a triplet (i.e., a 3-tuple), a quadruplet (i.e., a 4-tuple), a quintuplet (i.e. a 5-tuple), etc. of images of the same scene respectively acquired simultaneously by each of said sensors. However, the device may also comprise only one sensor associated with an optical arrangement based on mirror(s) and optionally of prism(s), making it possible to successively acquire several images of the same scene seen at different angles.

A "monocular" imaging device is an acquisition device comprising only one image sensor.

"Registration" consists in determining the spatial relationship between two representations (2D image or 3D surface) of the same object so as to superimpose the representations of the same physical point.

The "pose calculation" is the estimating of the position and orientation of the imaged scene relative to the imager (image sensor). It is one of the fundamental problems in computer vision, often called "Perspective-n-Points" (PnP). This problem consists in estimating the pose (2-tuple $[R_j; t_j]$ formed of the rotation matrix $R_j$ and translation vector $t_j$) of the camera relative to an object in the scene, which amounts to finding the pose that makes it possible to reduce the reprojection error between a point of the space and its 2D equivalent in the image. A more recent approach, called ePNP for "Efficient Perspective-n-Point", assumes that the camera is calibrated, and takes advantage of doing away with the calibration problems by normalizing the 2D points by multiplying them by the inverse of the intrinsic matrix. This approach adds to this the fact of setting the pose of the camera by passing through 4 control points, ensuring that the estimated transformation is rigid. Doing this makes it possible to shorten the calculation times.

A "depth map" associated with a 2D image is a 2D representation form of the reconstructed 3D information, corresponding to the portion of the 3D scene reprojecting in the 2D image. In practice, it involves a set of values, coded in the form of levels (or shades) of gray, respectively associated with each pixel pi the 2D image; the greater the distance between the point of the three-dimensional scene and the plane of the 2D image, the darker the pixel.

A "Convolutional Neural Network" (or CNN) is a type of feed-forward artificial neural network consisting of a multilayer stack of perceptrons, the purpose of which is to preprocess small amounts of information. A CNN consists of two types of artificial neurons, arranged in "strata" or "layers" successively processing the information:

the processing neurons, which process a limited portion of the image (called "receptive field") through a convolution function; and the (total or partial) pooling neurons of the outputs, called pooling neurons, which make it possible to compress the information by reducing the size of the intermediate image (often by sub-sampling).

The set of outputs of a processing layer makes it possible to reconstitute an intermediate image, which serves as a basis for the next layer. Non-linear and point correction processing may be applied between each layer to improve the relevance of the result. CNNs currently have wide applications in the field of image recognition.

Figure 1:
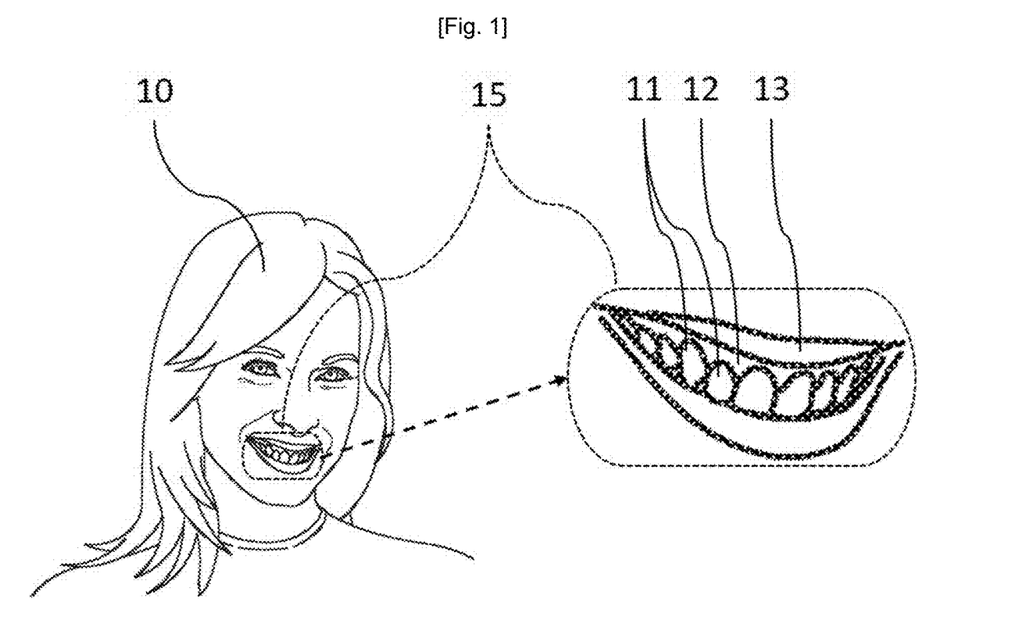
FIG. 1 is a representation of the face of a human patient whose dental arch can be the subject of 3D optical impression by virtue of the method according to the invention.

FIG. 1 shows the face of a patient, more particularly a young woman 10 smiling. As shown in detail 15 of the figure, which corresponds to the area of the patient's mouth, the mouth opens when the patient smiles. This reveals at least part of her dentition. The area of the mouth comprises teeth, in this case the upper dental arch 11, of the gum 12, the upper lip 13 and the lower lip 14. More generally, a dental arch of the patient 10 (or the two arches, upper and lower) is (are) visible when the patient opens her mouth. This dental arch can be the subject of 3D optical impression by virtue of the method according to the invention.

Figure 2:
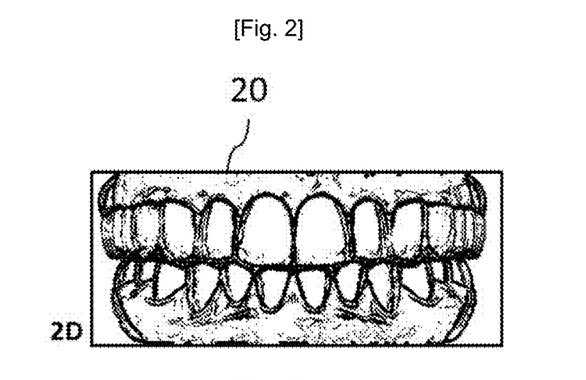
FIG. 2 is a 2D image of a 2D image of the global dental arch of the patient in FIG. 1, obtained with a wide-field and low-precision image acquisition apparatus.

FIG. 2 shows a 2D image of the entire dental arch of the patient in FIG. 1 (upper arch and lower arch included), obtained with a wide-field and low-precision image acquisition apparatus (or "global apparatus" in the context of the present disclosure).

Figure 3:
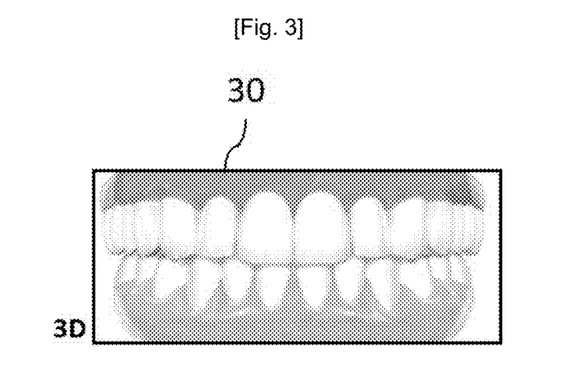
FIG. 3 is a low-precision 3D optical impression obtained by three-dimensional reconstruction from the 2D image of FIG. 2, according to embodiments of the invention.

FIG. 3 is a low-precision 3D optical impression obtained by three-dimensional reconstruction from the 2D image of FIG. 2, according to embodiments of the invention which will be described further.

Figure 4:
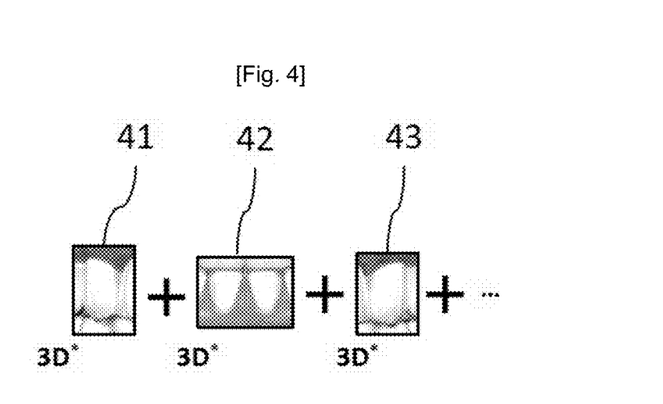
FIG. 4 is a series of 3D images corresponding to precise local 3D reconstructions of determined sectors of the patient's dental arch of FIG. 1, generated from a respective plurality of associated 2D images, each taken by a narrow-field and high-precision image acquisition apparatus.

FIG. 4 is a series of 3D surfaces corresponding to precise local 3D reconstructions of determined sectors of the patient's dental arch of FIG. 1, generated from a respective associated plurality of 2D images, each taken by an image acquisition apparatus, called a local apparatus, having a relatively narrower field but which is relatively more precise than the global apparatus that was used for the acquisition of the 2D image of FIG. 2. For example, the reconstruction 41 corresponds to the sector of the upper right canine of the patient; the reconstruction 43 corresponds to the sector of the upper left canine of the patient; and the reconstruction 42 corresponds to the sector of the two lower incisors of the patient.

Figure 5:
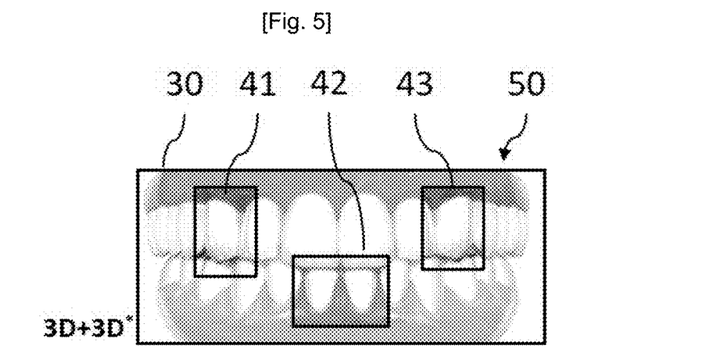
FIG. 5 is a 3D optical impression obtained by implementing the method according to the invention, by registering and merging the precise local 3D reconstructions of FIG. 4 with the global low-precision 3D reconstruction of FIG. 3.

Finally, FIG. 5 shows an extended 3D optical impression of the patient's arch, also called a precise 3D reconstruction 50, which was obtained by the implementation of the method according to the invention. More particularly, the improvement in the precision of the precise 3D reconstruction 50 relative to the global 3D reconstruction 30 comes from the registration and the merging of the precise local 3D reconstructions 41, 42 and 43 of FIG. 4 with the global 3D reconstruction 30 of FIG. 3. In the precise 3D reconstruction in FIG. 5, the local 3D reconstructions 41, 42 and 43 have been replaced with the corresponding parts of the global 3D reconstruction 30 of FIG. 3. In the example, the local 3D reconstructions 41 and 42 are placed on the upper arch, in place at the upper right canine and at the upper left canine, respectively, while the local 3D reconstruction 43 is placed on the lower arch, in place at the two lower incisors.

The person skilled in the art will appreciate that, although 2D images are acquired, from which local 3D reconstructions each corresponding to a determined portion of the patient's dental arch are generated so that, together, said local 3D reconstruction covers the totality of said arch, then their merging with the global 3D reconstruction 30 of FIG. 3 makes it possible to generate an extended 3D reconstruction of the arch (that is, a 3D reconstruction covering a substantial portion of the arch, for example a half-arch or even the totality of the arch) and possibly, of course, both of the upper arch and of the lower arch, which has the same precision as the local reconstructions. However, local 3D reconstructions such as reconstructions 41, 42 and 43 of FIG. 4 may have been acquired without a particular order, and without partial overlap between them, i.e., in reality without any particular relationship between them if it is, obviously, all based on 2D images of the dental arch of the same patient that is to be reconstructed in 3D with the best possible precision. In other words, their acquisition with a local apparatus such as an IOS does not need to comply with the severe constraints that are linked to the need to comply with a tracking path, which have been mentioned in the introduction of the present description.

The precise 3D reconstruction 50 of FIG. 5 can be displayed on a screen, in virtual reality glasses or in augmented reality glasses; it may also be stored in a mass memory or any other suitable storage medium; it may also be 3D printed, etc., according to the requirements of the application.

With reference to the functional diagram of FIG. 6, both an example of implementation of the method according to the first aspect of the invention and the functional means of an optical impression system according to the third aspect of the invention will now be described. In the figure, the steps of the method are represented by thick arrows. The other elements shown, apart from the 2D images and apart from the 3D surfaces corresponding to the 3D reconstructions obtained from said 2D images, are means of the impression taking system. We will begin by presenting them.

The impression taking system comprises a first image capture apparatus 61 (or image acquisition apparatus, or imager) called the general apparatus in the present description. By design, this global apparatus 61 has a relatively wide field of view, but a relatively low precision. It may be a photo or video camera, which can be integrated into a personal portable device of the patient or the practitioner. This type of portable device comprises, without the list being exhaustive, a mobile telephone, a digital tablet, augmented reality glasses, a two-dimensional intraoral camera, a photo camera, etc. We will subsequently refer to this type of apparatus by the expression "global apparatus" because it makes it possible to obtain a global view of the arch.

In one embodiment, the global apparatus 61 is used in video mode, acquiring time sequences of 2D images. With this operating mode, an algorithm of the SLAM type (Simultaneous Localization And Mapping) can be applied sequentially on the series of images, so as to produce an incremental 3D reconstruction as new images arrive.

In another embodiment, the global apparatus 61 is used in photo mode, acquiring only a single image at a time. To produce a dense 3D reconstruction from this single acquired image, it is possible to use the prediction of depth map per single image via the deep learning network 361. For further details on this method, the person skilled in the art may refer, for example, to the article by Laina et al *"Deeper Depth Prediction with Fully Convolutional Residual Networks"*, iEEE International Conference on 3D Vision (3DV), 2016.

To train this type of learning network, it is necessary to have a training database comprising pairs {2D image, associated depth map}. A method for generating such a database will be described below, with reference to the functional diagram in FIG. 7.

Figure 6:
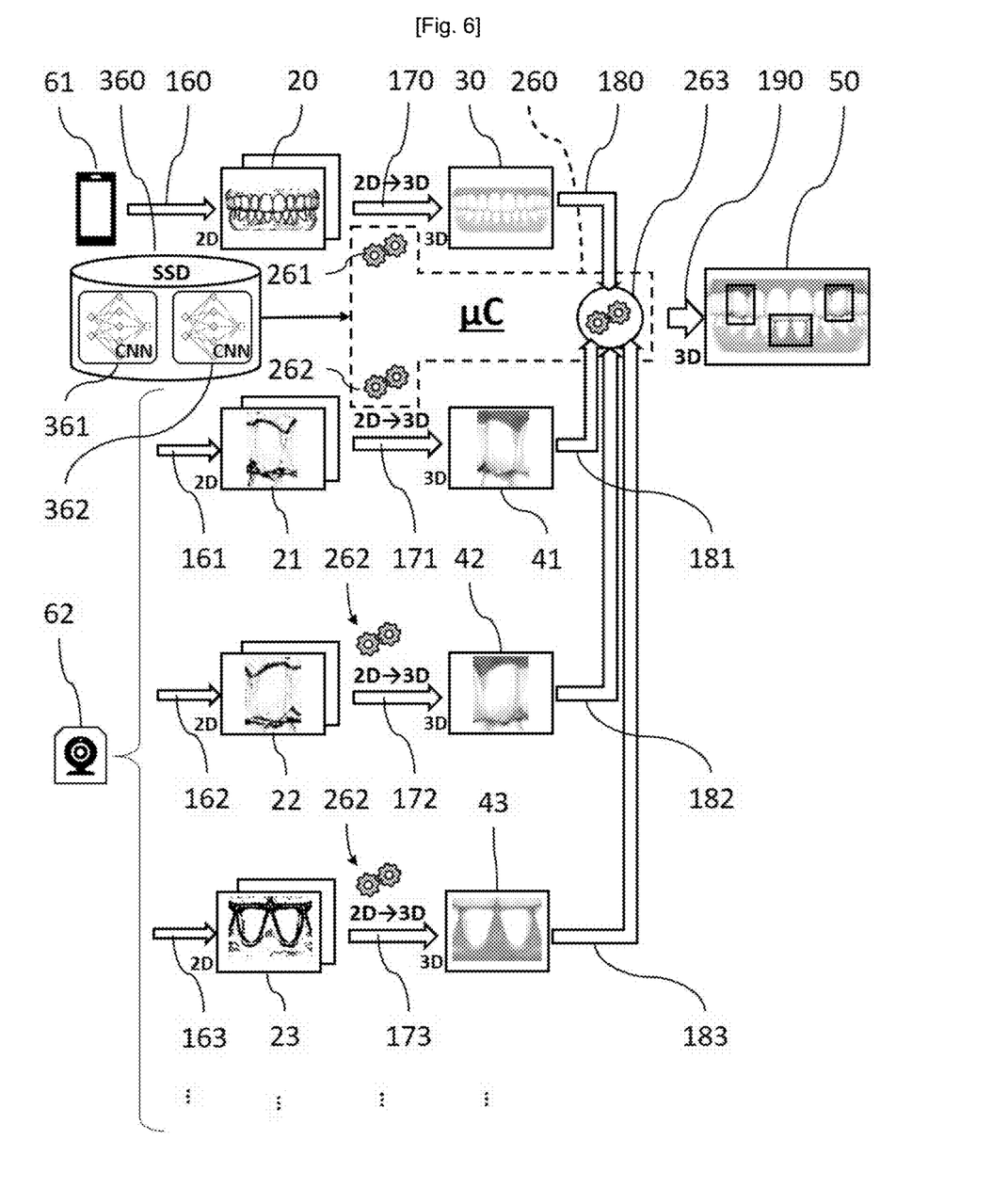
FIG. 6 is a functional diagram illustrating the implementation of the method according to the first aspect of the invention, by means of an optical impression device according to the third aspect of the invention.

As shown in FIG. 6, the system for implementing the method further comprises a second image capture apparatus 62, called a local apparatus in the present description. This local apparatus 62 also has a relatively narrower field of view, but a relatively greater precision, than the field of view and precision, respectively, of the global apparatus 61 by design. It may be an intraoral camera for the 3D reconstruction of intraoral surfaces from passive 2D images, for example an intraoral scanner (IOS).

Such an intraoral camera 62 is adapted to, and intended for the 3D reconstruction of intraoral surfaces from passive 2D images, provided by one or more image sensors. This type of device produces surface 3D reconstructions of the intraoral tissues in real time. The reconstruction may be textured in the case where one of the sensors at least is a color image sensor, for example coded in RGB format.

In the case of an intraoral camera having several passive sensors, the reconstruction can be done thanks to conventional multi-view stereoscopy algorithms. An example of this kind of algorithms is described, for example, in the article by A. Geiger, J. Ziegler and C. Stiller, "*StereoScan: Dense 3d reconstruction in real-time*" 2011 IEEE Intelligent Vehicles Symposium (IV), Baden-Baden, 2011, pp. 963-968.

In the case of an intraoral camera with a single sensor, reference may be made to the article by R. A. Newcombe, S. J. Lovegrove et A. J. Davison, "*DTAM: Dense tracking and mapping in real time*", 2011 International Conference on Computer Vision, Barcelona, 2011, pp. 2320-2327, or to the article by D. Eigen, C. Puhrsch and R. Fergus, "*Depth Map Prediction from a Single Image using a Multi-Scale Deep Network*", NIPS'14, Proceedings of the 27th International Conference on Neural Information Processing Systems—Volume 2, December 2014 pages 2366-2374.

In the case of several sensors with a structured light source, the technology depends on this structured light source. The person skilled in the art can refer to technical notes (user guides) from the manufacturers of this type of camera (list).

Although this is not indispensable, each of the image capture apparatuses 61 and 62 can advantageously be a monocular imager, that is comprising only a single image sensor. A monocular imager is in fact less expensive than the binocular imagers (or more generally multi-view stereoscopic devices) suitable for generating 3D reconstructions by multi-view stereoscopy. It will be seen below how three-dimensional reconstructions can be generated, according to embodiments, from a single two-dimensional image of the scene to be reconstructed. Of course, the use of binocular imagers, or multi-view stereoscopic imagers, is still also possible in the context of embodiments of the invention.

The imager of the devices 61 and 62 is for example a passive sensor. It may be a monocular sensor using CMOS technology or CCD technology. A static scene can be imaged by such a monocular, black and white or color image capture device. However, the person skilled in the art will appreciate that, in order to obtain textured 3D reconstructions, each of the apparatuses 61 and 62 and in any case at least the local apparatus 62 providing more precise local reconstructions comprises at least one color image sensor, for example in the RGB format. Furthermore, each of the apparatuses 61 and 62 can acquire 2D images in photographing mode (a single 2D image at a time) or in video mode (several 2D images over time according to any frequency).

In the embodiments of the method, the global apparatus 61 is adapted to, and intended to produce a global 3D reconstruction 30 of the dental tissues more rapidly (due to its enlarged field of view) but optionally less precise than the local apparatus. The local apparatus 62 can then be used to specify all or part of the global reconstruction 30, by producing more precise local reconstructions such as the reconstructions 41-43, which can be merged in the global reconstruction 30, to the appropriate location. There will be described later, in a first step, modes for implementing the 3D reconstruction by the global apparatus 61 which can be envisaged in order to produce a global 3D reconstruction. An embodiment will then be detailed for merging the global reconstruction 30 and the local reconstructions 41-43.

In advance, the presentation of the constituent means of the extended optical impression system shown in FIG. 6 is continued.

The system comprises a computing Unit 260, for example a microprocessor of a computer (Central Processing Unit) or a group of processors for example within a graphics card (GPU, or Graphics Processing Unit). The computing unit is configured to execute digital data processing algorithms coded in software. In particular, in embodiments, the computing unit 260 is configured to execute a first algorithm 261 and a second 3D reconstruction algorithm 262, as well as an algorithm 263 for merging 3D surfaces, to which we will return later.

Furthermore, the system further comprises a digital information storage system 360, for example a hard drive using SSD technology (solid-state drive) or other. The storage system 360 is adapted to permanently store the digital information defining the convolutional neural networks 361 and 362 (or CNN). These neural networks 361 and 362 are used by the algorithms 261 and 262, respectively, to generate 3D reconstructions, each time from at least one 2D image. The neural networks 361 and 362 are trained for this purpose, during respective learning phases to which we will also return later.

The person skilled in the art will appreciate that the storage system 360 can be physically included directly in the optical impression system, or else be remote, for example on a computer or a remote computing server. In the latter case, the system can access the calculation server by an ad-hoc communication network, for example by an intranet or by the Internet, for example via an Ethernet network or a wireless radio-communication network such as a 3G-LTE, 4G or 5G network, without this affecting the implementation of the method.

Figure 8:
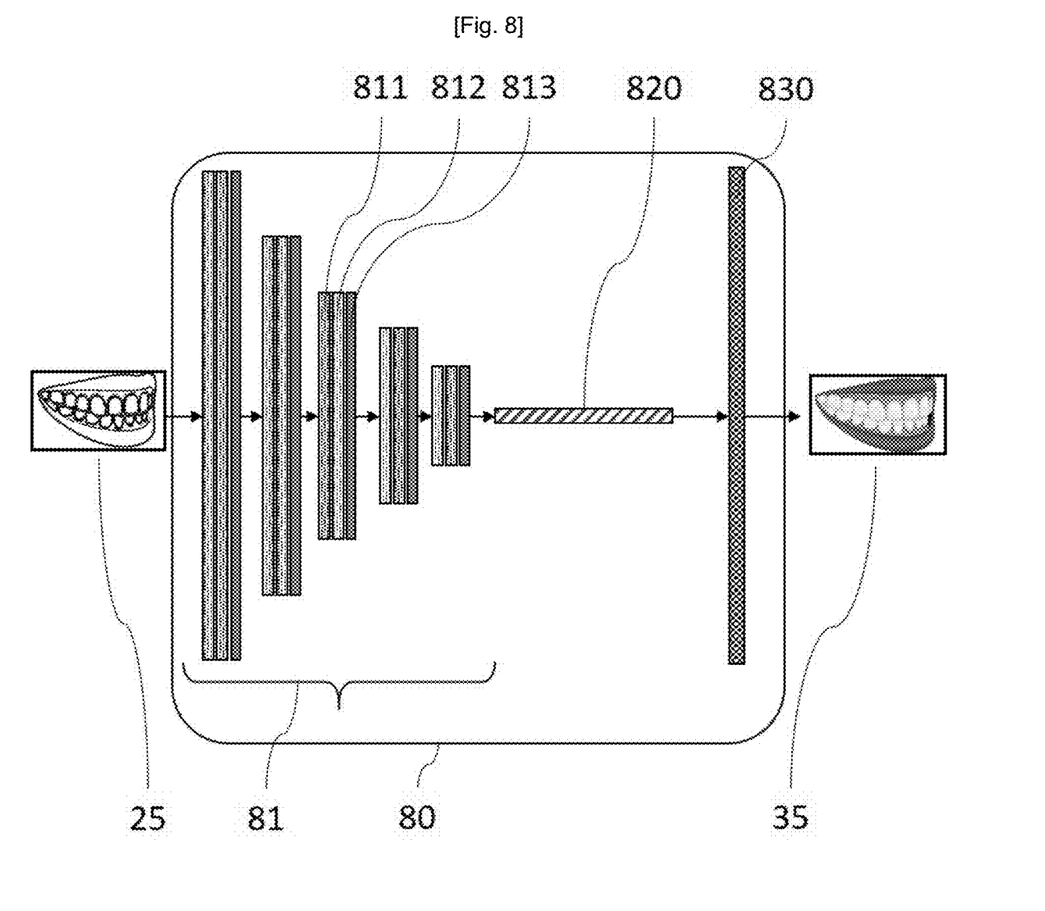
FIG. 8 is a functional diagram illustrating a CNN architecture that can be used in embodiments of the invention.

In an embodiment illustrated by FIG. 8, the deep learning architecture 361 is a convolutional neural network 80 which can have an entirely conventional structure. This type of CNN is available in open-access libraries known to the person skilled in the art. At the input, a two-dimensional image 25 is provided in the form of a matrix of pixels. It has two dimensions for a greyscale image. If appropriate, the color is represented by a third dimension, of depth 3 in order to represent the fundamental colors [Red, Green, Blue].

FIG. 8 shows a particular example of CNN, which is in fact an FCN (Fully Convolutional Network) inspired by the article by J. Long, E. Shelhamer et T. Darrell, "Fully convolutional networks for semantic segmentation", IEEE Conference on Computer Vision and Pattern Recognition (CVPR), Boston, MA, 2015, pp. 3431-3440. This FCN comprises two distinct parts, according to an encoding/decoding architecture.

The first part of the encoding FCN is the convolutional part itself. It comprises the "convolutional processing layer" 81, which has a succession of filters, or "convolution kernels", applied in strata. The convolutional processing layer 81 functions as an extractor of characteristics of the 2D images advised to the input of the CNN. In the example, the input image 25 is passed through the succession of convolution kernels, creating each time a new image called a convolution map. Each convolution kernel has two convolution layers 811 and 812, and a layer 813 of reducing the resolution of the image by a pooling operation also called local maximum operation (or "max pooling").

The output of the convolutional part 81 is then provided at the input of a final convolution layer 820 capturing all the visual action field of the preceding layer, and thus mimicking a fully connected layer.

Finally, a final deconvolution layer 830 produces a depth map 35 that, thanks to the implementation of the embodiments, is a depth map to scale.

It will be noted that the algorithm 362, which has the function of generating the local 3D reconstructions can also have the structure of the convolutional neural network 80 of FIG. 8, or any other known deep learning structure.

Figure 7:
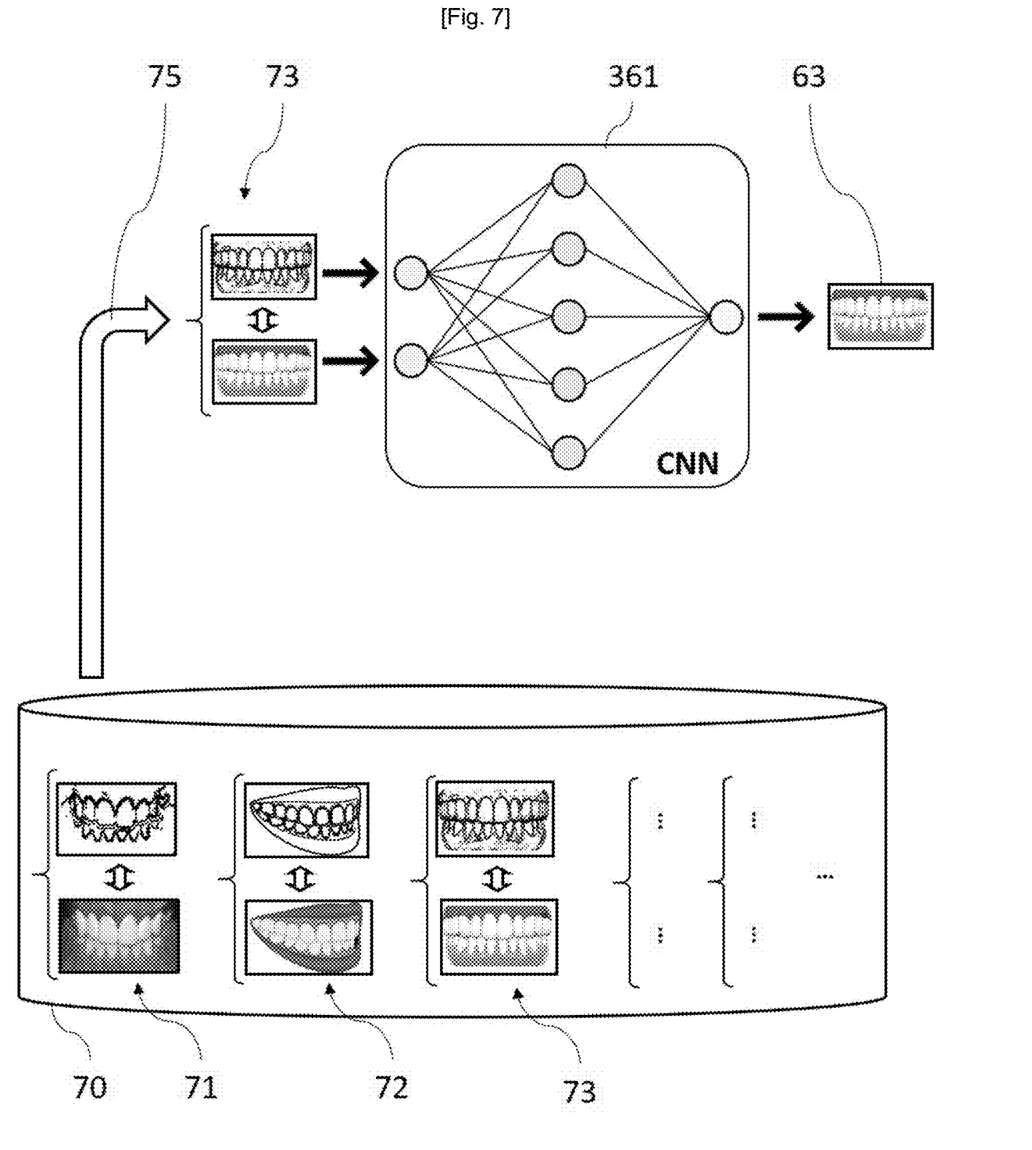
FIG. 7 is a functional diagram illustrating the training of one of the CNNs that are used by the method of FIG. 6.

FIG. 7 is a functional diagram illustrating the training of one of the convolutional neural networks 361 and 362 which are used by the method of FIG. 6, to generate the global 3D reconstruction and the local 3D reconstructions, respectively.

It should be noted that there is no prerequirement as to the number of sensors present in the global imager 61 (nor in the local imager 62, elsewhere), this number possibly being equal to one. In other words, the embodiments of the invention allow applications in which the global apparatus 61 of the impression acquisition system comprises only one sensor only.

For training the neural network 361, a 2D image or video acquisition apparatus is used that is comparable to the global apparatus 61, in the sense that it has identical or similar intrinsic characteristics. This apparatus is for example a mobile phone comprising one or more passive sensors, at least one of which is a color image sensor (if it is desired to obtain textured 3D reconstructions), and the field of view of which is sufficiently wide to include all of a dental arch, even if this means that its 2D precision is less.

Considering a group of several persons, for which a precise and textured 3D reconstruction of the dental arch of each of them has been previously obtained, for example by using an intraoral camera for the 3D reconstruction from passive 2D images as described above, with which the tracking path in accordance with the method of using such an IOS to take an optical impression of a dental arch according to the prior art. For each of these people, rough 2D images of the dental arch according to different viewing angles with the aforementioned global apparatus are also taken. On each of these images, 2D feature points are manually annotated. These same points are annotated manually on the 3D reconstruction of the person's dental arch. For each image, a set of 2D point/3D point correspondences, between the 2D images acquired by the global apparatus and the 3D surface previously obtained by the IOS, is thus obtained.

Thanks to these correspondences, and to the intrinsic properties of the sensor, the relative pose of the 3D model in relation to the 2D image in question is calculated, for example, with the aforementioned ePNP algorithm. It will be noted that if the intrinsic properties of the sensor of the overall apparatus are not known, it is possible to take into account random intrinsic properties, provided that they are kept constant throughout the learning process and then during the use of the CNN in the prediction phase, for the prediction of global 3D reconstructions.

Once the pose has been estimated, a depth map of the 3D model in the 2D image can be calculated. For each person, {image 2D, associated depth map} pairs or the training of the deep learning network 361 are thus obtained. In FIG. 7, these pairs bear the references 71, 72, 73, etc. They are stored in a training database 70, and are used, in 75, to train the deep learning network 361.

The proposed solution for training the deep learning structures 261 and 262 is a training solution of the convolutional neural network 80 in a semi-supervised manner. The concept of semi-supervision refers to the fact that a on-board method has been mounted to generate training data: there is therefore a "manual" transfer of data from one algorithm to another, i.e. the process of generating the stored learning pairs 71, 72, 73, etc. on the one hand, the training process itself, on the other hand. As the person skilled in the art will appreciate, however, the generating of training data can remain automatic. In contrast, non-supervision refers to the fact that the network would find inference rules making it possible to produce depth maps on its own, by analyzing the input data, which is difficult to consider. Total supervision refers to giving training data not from an automatic process, but coming from a fully manual process, for example by creating depth maps "by hand" by physical measurement, which is not the case here.

As shown in FIG. 7, semi-supervised training according to the embodiments is carried out from training pairs stored in the training database 70. This training can be implemented by an appropriate computer, for example a graphics processor (or GPU, Graphics Processing Unit) capable of carrying out large amounts of computing.

The training of the deep learning structure 361 is performed once for all, by the manufacturer of the 3D optical impression system. Once trained, this network is capable of predicting a depth map 63 for any 2D image taken by the global apparatus 61 and comprising a toothed portion. It is then loaded into the data storage system 360 of each device sold, in order to be used in the prediction phase. It can then be updated, if applicable.

The person skilled in the art will appreciate that the relevance of the prediction by the deep learning network 361 is not limited only to those persons involved in the learning phase. It is limited, however, to 2D images comprising toothed portions. Furthermore, the deep learning network 361 can only predict the depth map for the toothed portion (that is, rather, all of the static dental tissues and visible on the surface, therefore including the gums, the teeth, and the prosthetics if any). It is also limited to the type of device involved in training, because of its intrinsic properties. For example, if training was performed on reality glasses augmented by a certain trademark and certain generation (e.g. Google Glass Enterprise™ Edition 2), the prediction will be valid only for this trademark and generation of glasses (assuming that the variability of the intrinsic properties between all these spectacles is low compared with the target prediction precision), but not for all the apparatuses of that trademark nor for all the apparatuses of that generation, respectively.

In the prediction phase, the predicted depth map can be advantageously converted into a textured 3D point cloud, by simple inverse projection. This 3D point cloud can in turn be processed by a triangular mesh algorithm (see for example the article by Kazhdan et al "*Screened Poisson surface reconstruction*", ACM Transactions on Graphics (TOG), Volume 32 (3), Jun. 1, 2013) to produce a textured triangulated model.

In order to remove the ambiguity related to the scale factor, the technique described in another patent application of the same inventors and the same applicants may be used, filed on the same day before the same Industrial Property office, and having as the title "*Génération de modèles 3D à l'échelle à partir d'images 2D produites par un dispositif d'imagerie monoculaire* (Generating 3D scale models from 2D images produced by a monocular imaging device)". Otherwise, the person skilled in the art will appreciate that this ambiguity is not prohibitive, and can be addressed at a later stage, during the registration with the local reconstruction, which will be explained below.

In the preceding paragraphs, we have described how it is possible to obtain real-time 3D reconstructions from the two types of apparatus, namely the global apparatus 61 and the local apparatus 62.

Reference is again made to FIG. 6, this time to describe the implementation of the method for taking an extended optical impression of the dental arch of a patient. The steps of this method are implemented under the control of a practitioner, namely a dentist or dental surgeon, and/or their assistant if applicable.

In a first step, the method comprises steps allowing the practitioner to obtain the global 3D reconstruction 30. For this, in 160, a low-precision 2D image 20 of the patient's dental arch is captured with the global apparatus 61. Then, in 161, the global 3D reconstruction 30 is generated in 170, from the image 20, by the reconstruction algorithm 261. These digital data processing means 261 are adapted to generate a relatively coarse global three-dimensional reconstruction 30, of the dental arch from the two-dimensional image 20.

In the exemplary embodiment shown in the figure, the algorithm 261 is executed by the computing unit 260 of the extended 3D impression system. As already explained, however, this is not mandatory. Indeed, when the global apparatus 61 is a smartphone, whether the patient's smartphone or that of the practitioner, the algorithm 261 can be executed by an application installed on the smartphone, which is therefore capable of generating itself the low-precision global 3D reconstruction 30. That reconstruction is then transmitted to the system by any one of the communication means that have already been presented above, so that the practitioner has it. The reconstruction algorithm 261 can also be executed in a calculation server, as also already explained in the foregoing, and be transmitted to the system, which is then able to communicate with said server for this purpose. Finally, when the global apparatus 61 is for example a pair of augmented reality glasses, the algorithm 261 can be executed in said glasses directly, so that the global 3D reconstruction 30 is obtained by the practitioner himself, in their office. It is then made accessible in 180 to the computing unit 260, to which the augmented reality glasses can be connected, for example by a USB (Universal Serial Bus) or Bluetooth™ connection, or by a short-range wireless network such as a Wi-Fi or NFC (Near Field Communication), for example.

Then, in a second step, the method comprises the acquisition of a plurality of local 2D images of respective associated sectors of the dental arch with the local apparatus 62. It should be noted that the local apparatus 62 has a relatively more restricted field of view and a relatively higher precision than the global apparatus 61. Furthermore, the method comprises generating, in 171, 172, 173, by second digital data processing means that implement the reconstruction algorithm 362, respective local 3D reconstructions, relatively more precise than the global 3D reconstruction 30, of said associated sectors of the dental arch.

In the example shown in FIG. 6, three local 2D images 21, 22 and 23 are acquired, in 161, 162 and 163, respectively, using the local apparatus 62, for example an IOS. These acquisitions are carried out by the practitioner, in their office. Advantageously, no particular proximity relationship (and in particular partial overlap relationship), nor setting order, needs to be respected. In particular, no tracking path needs to be followed by the practitioner to produce this series of acquisitions. In other words, the acquired 2D images can be totally decorrelated from one another, the only constraint obviously being that they are all of the images of the same dental arch (i.e., images taken from the mouth of the same patient) as the global 2D image 20.

In a third step, finally, the practitioner can then pose all or part of the local 3D reconstructions 41, 42 and 43 that it has obtained in 181, 182, 183, over the spatial canvas constituted by the global 3D reconstruction 30. For this, the method implements the merging, by a merging algorithm 263 implemented by digital data processing means, of the global three-dimensional reconstruction and local three-dimensional reconstructions into a single total three-dimensional reconstruction 50, which is a precise 3D reconstruction (i.e., one made more accurate). In the precise reconstruction 50, the local 3D reconstructions 41, 42 and 43 are respectively substituted with portions of the global three-dimensional reconstruction 30 which correspond to the associated sectors of the patient's dental arch.

The digital processing means which execute the merging algorithm 263 are configured to adjust each local 3D reconstruction 41-43 on the global 3D reconstruction 30, i.e., bringing the local reconstruction into the reference frame of the global reconstruction. It will be noted that these two reconstructions differ from one another only by a relative spatial transformation with 7 degrees of freedom, namely 3 degrees of freedom in rotation, 3 degrees of freedom in translation, and 1 scale factor.

Once each local 3D reconstruction 41-43 has been adjusted on the global 3D reconstruction 30, it is sufficient to replace, in step 190, the global reconstruction portion 30 covered by each local 3D reconstruction 41, 42 and 43 in order to have a more precise 3D representation in the portions of the global 3D reconstruction 30 to which the local 3D reconstructions have been substituted. In this way, the global precise 3D reconstruction 50 is thus obtained. This reconstruction 50 is an extended optical impression of the patient's dental arch, which has the best possible precision, determined by that of the local apparatus 62, but generated more quickly and more easily, without the obligation for the practitioner to follow the tracking path.

There follows a description of an embodiment of the two-step registration, where a first relatively coarse registration is first estimated, then is refined by a second finer registration.

As regards the coarse registration, it is assumed that the global and local reconstructions are segmented, i.e. that each 3D point of each of these reconstructions can be labeled by a semantic class, in this case the type of teeth (molars, canines, incisors, etc. according to conventional numbering used in dentistry). It is then possible, for each 3D reconstruction, to find the centroid of each semantic class, i.e. the barycenter of each type of tooth. By matching each time (i.e., for each local 3D reconstruction), the centroid of each type of tooth between the two general and local reconstructions 3D, it is then possible to find the relative transformation. The person skilled in the art can consider, for example, the use of the Umeyama algorithm (see the article by S. Umeyama, "*Least-squares estimation of transformation parameters between two point patterns*", April 1991, IEEE Transactions on Pattern Analysis and Machine Intelligence, PAMI-9 1991, Vol. 13, no. 4, pp. 376-380).

Once the coarse registration has been obtained, finer registration can then be performed, for example by the ICP algorithm (for "Iterative Closest Point"; see, for example, the article by P. J. Besl and N. D. McKay, "A Method for Registration of 3-D Shapes", IEEE Transactions on Pattern Analysis and Machine Intelligence, PAMI, Los Alamitos, CA, USA, IEEE Computer Society, vol. 14, no. 2, February 1992, pp. 239-256).

For coarse registration, it has been assumed that it is known how to segment the 3D model in real time. In one embodiment, the deep learning network 361 can be replaced by a more sophisticated learning network, which is capable of predicting for each 2D image the depth map as well as a segmentation map, i.e., a 2D map giving for each pixel the semantic class to which it belongs.

An example of this type of training network more evolved may be found in the article "*Towards unified depth and semantic prediction from a single image*", Wang et al., The IEEE Conference on Computer Vision and Pattern Recognition (CVPR), 2015, pp. 2800-2809. Thus, by predicting for each 2D image the corresponding segmentation map, it is then possible to make the inverse projection, in order to label each 3D point.

In order to produce such a more sophisticated training network, it is necessary to have training data. In addition to the training data for training the deep learning network 361, associated segmentation maps must also be available for each 2D image. This can be done by manually annotating the images (i.e., by assigning to each pixel the associated semantic class, which is easy for the human eye). This method is relatively tedious, but it is conventional in the generation of training data. It is possible to replace it with a semi-automated method, for example by manually labeling a 3D model and by reprojecting the label into all the images that have been used to reconstruct this 3D model, but the description of this mechanism would depart from the scope of the present description.

The technical description of embodiments that has been given above has shown how each type of apparatus can produce textured 3D reconstructions in real time, regardless of the number of sensors (which may be reduced to one) and the number of images (depending on whether the apparatus is used in photo mode or in video mode). It has also been explained how these 3D reconstructions can be combined in order to complement one another: the global reconstruction, fast to estimate but less precise, can be improved by local 3D reconstructions carried out by a local apparatus while acting as an anchoring structure for the posing of said local 3D reconstructions.

A description will now be given of a few practical use cases, in which such a combination of a global apparatus and a local apparatus can be advantageous.

In one embodiment, the global apparatus can be combined with the local apparatus, i.e. an intraoral camera, with the difference coming from the usage conditions for generating the global 3D reconstruction and for that of the local 3D reconstructions, respectively. The use as the global apparatus is done for example by returning the camera of the scene to the use as a local apparatus, in order to have a global view (whole dental arch) or semi-global (half-arch). The image coming from the local sensor such as an IOS at such a distance is often low-precision, but may nevertheless prove to be usable to obtain a coarse 3D surface, serving as global 3D reconstruction according to the embodiments of the invention.

In one embodiment, the global apparatus 61 and the local apparatus 62 can be one and the same apparatus in the sense that, for example, the intraoral camera 62 can be designed to integrate, on the one hand, one or more local sensors having high precision but a narrow field (typically imaging a zone of 3 cm×2 cm) and, on the other hand, one or more global sensors having a relatively lower precision but a relatively higher field (typically imaging an area comprising between a half-arch and a complete arch). The practitioner performs a first global 3D reconstruction using global sensors, then switches on the local sensors to locally refine the global 3D reconstruction with local 3D reconstructions.

In embodiments, the global apparatus 61 may be a mobile phone provided with a passive or active 2D sensor, so as to integrate in a telemetry approach. The image sensor of a mobile phone is a wide-field sensor, but which has a relatively low precision with regard to the imaging standards in dentistry. In this case, the 2D image can be taken at the home by the patient himself, and this 2D image or a 3D reconstruction, which is generated on the basis of said 2D image, can only be obtained at a later time by the practitioner within his dental office. Using this device, a patient can, in fact, on their own or with the aid of someone they know, make 2D images of their dental arch. These 2D images can be converted into a global 3D reconstruction by the algorithm 261, as described above.

When the algorithm 261 is executed on the mobile phone, for example by an application program installed on said phone, the patient can then transmit the global 3D reconstruction to his practitioner for diagnostic, aesthetic notice, etc. As soon as it obtains the global 3D reconstruction, the practitioner can formulate a first medical and/or aesthetic diagnosis based on this global 3D reconstruction. The practitioner does not need a very precise 3D reconstruction for this. They may optionally offer an office visit to the patient. During this appointment, the practitioner can then locally refine the 3D reconstruction at least for the sectors of the dental arch (or dental arches) concerned by the envisaged treatment, using a local apparatus 62, for example an IOS.

The global 3D reconstruction 30 can be transmitted directly to the dentist or dentist surgeon, by email, or by a wireless data transmission network, such as a 3G-LTE, 4G, or 5G cellular communications network. It may travel through a computer server, or computing server, wherein automatic algorithms can process this global 3D reconstruction in order to derive various indicators, for example automatic detection of pathologies (caries, decay, etc.), or to make aesthetic proposals (automatic alignment of the teeth), publish examples quotes on prosthetic or aesthetic treatments, etc. These indicative information can be proposed to the patient, which they can decide to transmit to their practitioner in order to get their opinion.

Alternatively, the 3D reconstruction algorithm 261 can be executed on a computer server, based on the 2D image of the arch taken by the patient with their mobile phone. In this case, it is the 2D image that is transmitted to the practitioner by email or by 3G-LTE, 4G or 5G network, via said server. Such a server can host a service platform, connecting the patients and practitioners. This platform can have computing means configured to implement the 3D reconstruction algorithm, in particular. The practitioner then indirectly obtains the 3D reconstruction of the patient, via said service server.

In another variant, the global apparatus can be a pair of augmented reality glasses, for example available at the office of the dentist or dental surgeon. The sensor of this type of device has a relatively wide field, i.e., capable of covering an extended portion of a dental arch, for example at least one half dental arch. Thus, during a first inspection of the oral cavity by carrying this device, the practitioner can himself obtain, directly and rapidly, a global reconstruction from the first image acquired. This solution has the advantage of making it possible to integrate the 2D image of the dental arch automatically into the dematerialized digital workflow of the practitioner.

For example, the global 3D reconstruction can be performed in real time when the practitioner sweeps their gaze across the oral cavity through the augmented reality glasses.

The global 3D reconstruction 30 can be displayed in an alpha-transparency on the augmented reality glasses as it is estimated. By virtue of the 3D reconstruction method described above, this display is easy to install, given that the 2D image used to perform the global 3D reconstruction 30 is the same as that seen by the glasses. Such a pose of the 3D reconstruction in the 2D image, known per se, allows the practitioner to know at any moment which area(s) of the arch they have reconstructed via the glasses, in order to be able to add to it, if need be, by changing the angle of view.

In one embodiment, the global reconstruction 30 remains displayed on the augmented reality glasses, as the practitioner adds to it thanks to a local image acquisition apparatus. Given that each local 3D reconstruction 41, 42, 43, etc. is registered on the global 3D reconstruction 30, it is then possible to display it in alpha transparency on the augmented reality glasses, over the global 3D reconstruction 30, for example using a different color. This allows the practitioner to know which area(s) they have already made precise using the local device.

The present invention has been described and illustrated in this e present detailed description and in the figures of the accompanying drawings, in possible embodiments. The present invention is not, however, limited to the embodiments presented. Other variants and embodiments can be deduced and implemented by a person skilled in the art on reading the present description and the accompanying drawings.

In the present disclosure, the term "comprising" or "including" does not exclude other elements or other steps. The various features presented can advantageously be combined. Their presence in different parts of the present patent application does not exclude this possibility. The reference signs in the drawings cannot be understood as limiting the scope of the invention.

The invention claimed is:

1. A method for generating a three-dimensional reconstruction of a patient's dental arch, called an extended optical impression, comprising the following steps:
    obtaining at least one global two-dimensional image of the acquired dental arch with a first image sensor having a relatively wide field of view and relatively low precision, and generating by first digital data processing means a global, relatively coarse three-dimensional reconstruction of the dental arch from said two-dimensional image;
    acquiring a plurality of respective local two-dimensional images of respective associated sectors of the dental arch with a second image sensor having a relatively more restricted field of view and a relatively higher precision than the first image sensor, and generating by second digital data processing means respective local three-dimensional reconstructions, relatively more precise than the global three-dimensional reconstruction, of said associated sectors of the dental arch;
    merging, by a merging algorithm performed by third digital data processing means, the global three-dimensional reconstruction and local three-dimensional reconstructions into a single total three-dimensional reconstruction wherein the local three-dimensional reconstructions are respectively substituted for portions of the global three-dimensional reconstruction that correspond to the associated sectors of the dental arch, the global reconstruction playing a role of absolute spatial guide, said merging comprising a setting of the local three-dimensional reconstructions in the global three-dimensional reconstruction, said setting being adapted to minimize a distance between the point clouds corresponding to each of the associated sectors of the dental arch and the corresponding point cloud of the global three-dimensional reconstruction.

2. The method according to claim 1, wherein the first image sensor is an image sensor of a portable digital apparatus of the patient, such as a mobile phone, and wherein the global two-dimensional image is acquired by the patient itself using his portable digital apparatus and is transmitted from said portable digital apparatus to the practitioner to generate the global three-dimensional reconstruction.

3. The method according to claim 1, comprising acquiring the global two-dimensional image by the practitioner using the first image sensor.

4. The method according to claim 3, wherein the first image sensor is comprised in augmented reality glasses further comprising the first digital processing means for generating the global three-dimensional reconstruction.

5. The method according to claim 1, wherein the second image sensor is an intraoral scanner, comprising the second digital data processing means for generating local three-dimensional reconstructions.

6. The method according to claim 1, wherein the global three-dimensional reconstruction and/or local three-dimensional reconstructions are performed by generating, for each one, a depth map from a single 2D image acquired by the first sensor or by the second image sensor, respectively, based on a deep learning architecture trained beforehand for that purpose.

7. A computer program comprising instructions stored in a non-transitory medium, which, when the computer program is loaded into the memory of a computer and is executed by a processor of said computer, cause the computer to perform a method for generating a three-dimensional reconstruction of a patient's dental arch, called an extended optical impression, comprising the following steps:
    obtaining at least one global two-dimensional image of the acquired dental arch with a first image sensor having a relatively wide field of view and relatively low precision, and generating by first digital data processing means a global, relatively coarse three-dimensional reconstruction of the dental arch from said two-dimensional image;
    acquiring a plurality of respective local two-dimensional images of respective associated sectors of the dental arch with a second image sensor having a relatively more restricted field of view and a relatively higher precision than the first image sensor, and generating by second digital data processing means respective local three-dimensional reconstructions, relatively more precise than the global three-dimensional reconstruction, of said associated sectors of the dental arch;

merging, by a merging algorithm performed by third digital data processing means, the global three-dimensional reconstruction and local three-dimensional reconstructions into a single total three-dimensional reconstruction wherein the local three-dimensional reconstructions are respectively substituted for portions of the global three-dimensional reconstruction that correspond to the associated sectors of the dental arch, the global reconstruction playing a role of absolute spatial guide, said merging comprising a setting of the local three-dimensional reconstructions in the global three-dimensional reconstruction, said setting being adapted to minimize a distance between the point clouds corresponding to each of the associated sectors of the dental arch and the corresponding point cloud of the global three-dimensional reconstruction.

8. A device for generating a three-dimensional reconstruction of a patient's dental arch, called extended optical impression, comprising:

a first image sensor having a relatively wide field of view and relatively low precision for acquiring at least one global two-dimensional image of the dental arch, and first digital data processing means for generating a global, relatively coarse three-dimensional reconstruction of the dental arch from said two-dimensional image;

a second image sensor having a relatively more restricted field of view and a relatively higher precision than the first image sensor, for acquiring a plurality of local two-dimensional images of respective associated sectors of the dental arch, and second digital data processing means for generating respective local three-dimensional reconstructions, relatively more precise than the global three-dimensional reconstruction, of said associated sectors of the dental arch; and third digital data processing means configured to implement a merging algorithm adapted to merge the global three-dimensional reconstruction and local three-dimensional reconstructions into a single total three-dimensional reconstruction wherein the local three-dimensional reconstructions are respectively substituted for portions of the global three-dimensional reconstruction that correspond to the associated sectors of the dental arch, the global reconstruction playing a role of absolute spatial guide, the merging algorithm comprising a setting of the local three-dimensional reconstructions in the global three-dimensional reconstruction, said setting being adapted to minimize a distance between the point clouds corresponding to each of the associated sectors of the dental arch and the corresponding point cloud of the global three-dimensional reconstruction.

9. The device according to claim 8, comprising augmented reality glasses which comprise the first image sensor and, furthermore, the first digital processing means for generating the global three-dimensional reconstruction.

10. The device according to claim 8, comprising an intraoral scanner that comprises the second image sensor and, furthermore, the second digital data processing means for generating local three-dimensional reconstructions.

11. The device according to claim 8, wherein the first digital processing means and/or the second digital processing means are configured to generate the global three-dimensional reconstruction and the local three-dimensional reconstructions, respectively, by generating for each one a depth map from a single 2D image acquired by the first sensor or by the second image sensor, respectively, based on a deep learning architecture previously trained for this purpose.

* * * * *